United States Patent
Lopez (10) Patent No.: US 10,242,328 B2
(45) Date of Patent: Mar. 26, 2019

(54) TRACKING TELECOMMUNICATION EXPENSES

(75) Inventor: Claudio Marcelo Lopez, Buenos Aires (AR)

(73) Assignee: Service Bureau Intel S.A., Buenos Aires (AR)

( * ) Notice: Subject to any disclaimer, the term of this patent is extended or adjusted under 35 U.S.C. 154(b) by 1228 days.

(21) Appl. No.: 11/840,101

(22) Filed: Aug. 16, 2007

(65) Prior Publication Data

US 2008/0208650 A1     Aug. 28, 2008

Related U.S. Application Data

(60) Provisional application No. 60/891,691, filed on Feb. 26, 2007.

(51) Int. Cl.
| | | |
|---|---|---|
| *H04M 3/00* | (2006.01) | |
| *G06Q 10/06* | (2012.01) | |
| *G06Q 50/32* | (2012.01) | |

(52) U.S. Cl.
CPC ....... *G06Q 10/06* (2013.01); *G06Q 10/06311* (2013.01); *G06Q 10/06375* (2013.01); *G06Q 10/06398* (2013.01); *G06Q 50/32* (2013.01)

(58) Field of Classification Search
USPC .................................. 455/560; 705/1, 7, 30
See application file for complete search history.

(56) References Cited

U.S. PATENT DOCUMENTS

| | | | | |
|---|---|---|---|---|
| 4,691,346 A | * | 9/1987 | Vanacore ................ | H04M 3/38 379/188 |
| 5,425,087 A | * | 6/1995 | Gerber .................... | H04M 3/36 379/112.01 |
| 5,881,132 A | * | 3/1999 | O'Brien .............. | H04M 3/2254 379/230 |
| 6,029,144 A | * | 2/2000 | Barrett ................... | G06Q 99/00 235/375 |
| 6,687,353 B1 | * | 2/2004 | Brysch ................ | H04L 63/0218 379/189 |
| 6,718,024 B1 | * | 4/2004 | Heilmann ........... | H04L 63/0218 379/189 |
| 7,136,467 B2 | * | 11/2006 | Brockman ............. | G06Q 30/02 379/112.06 |
| 7,340,422 B2 | * | 3/2008 | Fisher .................. | G06Q 20/102 705/30 |
| 7,406,306 B2 | * | 7/2008 | Gallant ................... | H04L 12/14 379/120 |
| 7,437,460 B2 | * | 10/2008 | Chidambaran ... | G06F 17/30283 709/226 |
| 7,664,083 B1 | * | 2/2010 | Cermak .................. | H04L 67/22 370/338 |
| 7,692,582 B2 | * | 4/2010 | Wigren ................ | G01S 19/258 342/357.25 |

(Continued)

*Primary Examiner* — Talia F Crawley
(74) *Attorney, Agent, or Firm* — Fish & Richardson P.C.

(57) ABSTRACT

The present disclosure is directed to tracking telecommunication expenses. In some implementations, a method includes aggregating data associated with telecommunication services used by an employee. One or more policies of an enterprise are automatically identified for evaluating the used services. The enterprise policies are associated with the employee. A violation of one or more enterprise policies is determined based, at least in part, on comparing the aggregated data to the enterprise policies.

21 Claims, 3 Drawing Sheets

(56) References Cited

U.S. PATENT DOCUMENTS

| | | | | |
|---|---|---|---|---|
| 7,697,506 | B2* | 4/2010 | Narin | H04M 3/42272 |
| | | | | 370/352 |
| 2002/0110235 | A1* | 8/2002 | Simpson | H04M 1/505 |
| | | | | 379/377 |
| 2003/0061358 | A1* | 3/2003 | Piazza | G06Q 30/02 |
| | | | | 709/227 |
| 2004/0033815 | A1* | 2/2004 | Noldus | H04Q 3/0029 |
| | | | | 455/560 |
| 2005/0060662 | A1* | 3/2005 | Soares | G06Q 10/06 |
| | | | | 715/810 |
| 2006/0129412 | A1* | 6/2006 | Boss | G06Q 10/063 |
| | | | | 705/35 |
| 2009/0017790 | A1* | 1/2009 | Thalapaneni | H04L 29/12047 |
| | | | | 455/410 |
| 2010/0110927 | A1* | 5/2010 | Cermak | H04L 67/22 |
| | | | | 370/252 |

* cited by examiner

TRACKING TELECOMMUNICATION EXPENSES

CLAIM OF PRIORITY

This application claims priority under 35 USC § 119(e) to U.S. Patent Application Ser. No. 60/891,691, filed on Feb. 26, 2007, the entire contents of which are hereby incorporated by reference.

TECHNICAL FIELD

This invention relates to telecommunication services and systems.

BACKGROUND

Communication networks include wired and wireless networks. Example wired networks include the Public Switched Telephone Network (PSTN) and the Internet. Example wireless networks include cellular networks as well as unlicensed wireless networks that connect to wire networks. Calls and other communications may be connected across wired and wireless networks.

Cellular networks are radio networks made up of a number of radio cells, or cells, that are each served by a base station or other fixed transceiver. The cells are used to cover different areas in order to provide radio coverage over a wide area. Example cellular networks include Global System for Mobile Communication (GSM), Universal Mobile Telecommunications System (UMTS), Wide-band Code Division Multiple Access (WCDMA), and CDMA2000. Cellular networks communicate in a radio frequency band licensed and controlled by the government. Unlicensed wireless networks are typically used to wirelessly connect portable computers, PDAs and other computing devices to the internet or other wired network. These wireless networks include one or more access points that may communicate with computing devices using an 802.11 and other similar technologies.

SUMMARY

The present disclosure is directed to tracking telecommunication expenses. In some implementations, a method includes aggregating data associated with telecommunication services used by an employee. One or more policies of an enterprise are automatically identified for evaluating the used services. The enterprise policies are associated with the employee. A violation of one or more enterprise policies is determined based, at least in part, on comparing the aggregated data to the enterprise policies.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
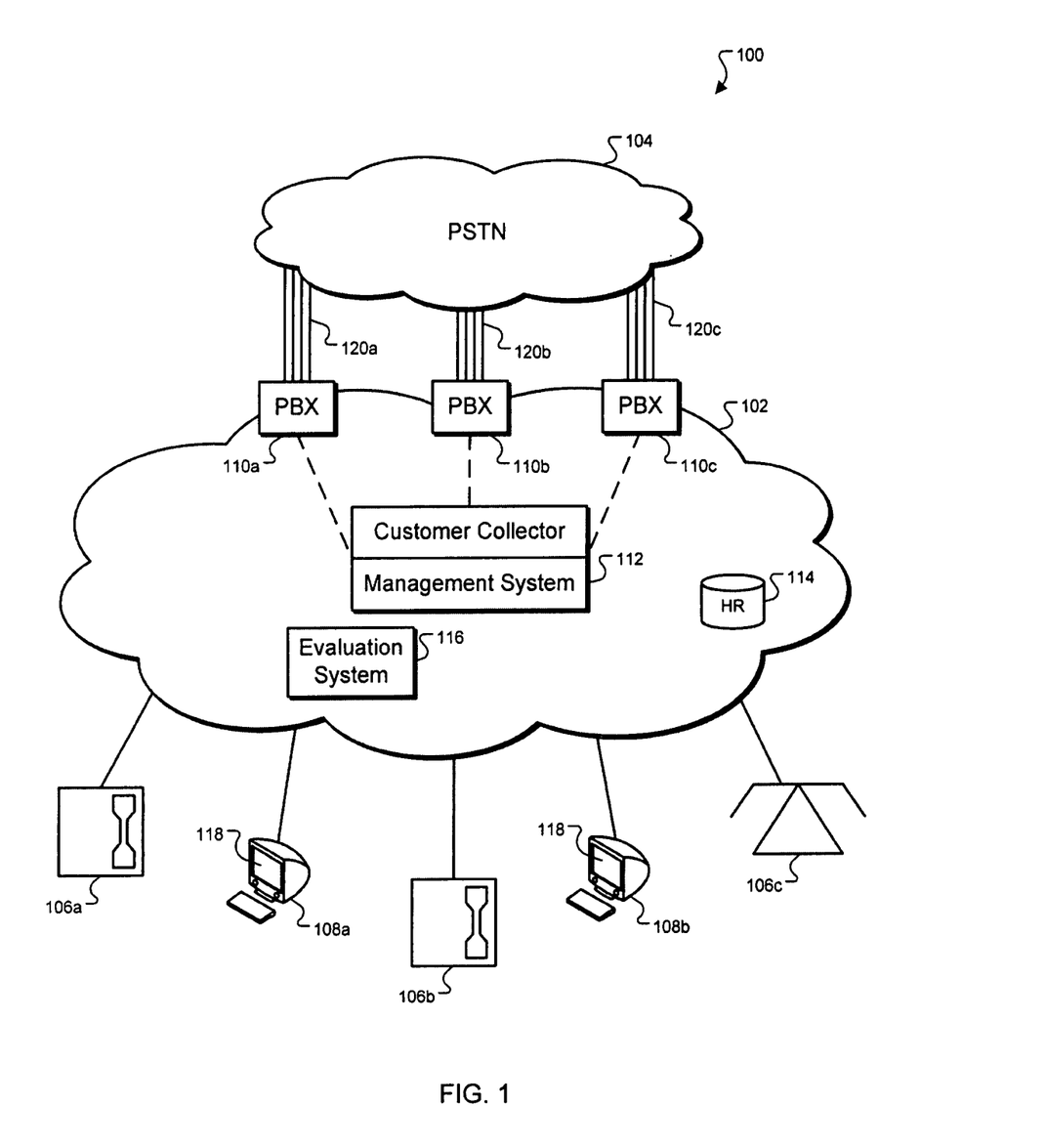
FIG. 1 is a block diagram illustrating an example communication system.

FIG. 1 is an example communication system 100 for managing telecommunication expenses in accordance with some implementations of the present disclosure. For example, the system 100 may manage expenses for using telecommunication services (e.g., local calls, international calls) associated with an enterprise (e.g., a company). In this and/or other examples, the system 100 may control and/or reduce telecommunication expenses in accordance with policies defined or otherwise associated with the enterprise. In general, the enterprise policies may be policies for consuming telecommunication services in the system 100 that are specified by the enterprise, one or more agreements, federal, state, international and/or multi-national regulations, as well as other sources. In addition, the enterprise policies can, in some implementations, be based on one or more parameters associated with employees such as, for example, individuals, employees positions, departments, as well as other information associated with one or more individuals. For example, a manager may have access to all telecommunication services while those being supervised may have access to a subset of those telecommunication services.

To avoid violating such policies, the system 100 may automatically determine services used on one or more levels (e.g., individual, department, title) and automatically filter the service usage in accordance with the enterprise policies. In response to identifying violations, a portion of system 100 can, in some implementations, avert or modify access to telecommunication services to substantially maintain the use of such services within the enterprise policies. For example, the system 100 may block a personal identification number (PIN) and/or extension of an individual to prevent the individual from accessing one or more telecommunication services. In short, the system 100 may execute one or more of the following methods: automatically receiving and/or including human-resource information (e.g., employee name, department, title) when monitoring telecommunication services; mapping, assigning, or otherwise associating PINs, extensions, and/or telecommunication assets with an individual; automatically determining whether requested telecommunication services are in accordance with enterprise policies; automatically preventing or otherwise reducing access to at least some telecommunication services in response to at least a violation of policies, enabling users to monitor use of telecommunication services by employees to determine accuracy of declarations; and others. In some implementations, the system 100 automates the monitoring and/or response to violations of enterprise guidelines and may enable one or more of the following ancillary benefits: reducing and controlling telecommunication expenses by implementing a corporate policy, providing law enforcement tools and promoting empowerment to employees to control his/her policy compliance, improving cost allocation and charge back activities by the accuracy of the assignment of PIN/extensions to employees, eliminating or otherwise reducing the cost of providing expense reports of management services to enterprises such as those enterprises having thousands of employees distributed in different geographical locations.

At a high level, the system 100 can, in some implementations, include an enterprise network 102 and a public switched telephone network (PSTN) 104. The enterprise network 102 is a network associated with an enterprise. The enterprise may comprise a corporate or business entity, a government body, a non-profit institution, or any other organization with a plurality of telecommunication assets 106, clients 108, Private Branch eXchanges (PBXs) 110a-c, management system 112, and an evaluation system 116. The enterprise may be the owner of at least some of the assets 106, clients 108, the PBXs 110a-c, the management system 112, and/or the evaluation system 116. Of course, the enterprise may also lease one or more of the assets 106, clients 108, the PBXs 110a-c, the management system 112, and/or the evaluation system 116 or may hire contractors or agents who are responsible for maintaining, configuring, controlling, and/or managing the assets 106, clients 108, the PBXs 110a-c, the management system 112, and/or the evaluation system 116. In some implementations, the enterprise manages the telecommunications services accessed by the assets 106 through the enterprise network 102. For example, the enterprise may distribute commands preventing accesses to one or more telecommunication services by one or more assets 106 associated with the enterprise network 102. In the illustrated implementation, enterprise network 102 facilitates wireless and/or wireline communication between assets 106, the clients 108, and other enterprise elements. The enterprise network 102 may communicate, for example, Internet Protocol (IP) packets, Frame Relay frames, Asynchronous Transfer Mode (ATM) cells, voice, video, data, and other suitable information between network addresses. In addition, while enterprise network 102 is illustrated as a single network, the enterprise network 102 may comprise a plurality of networks. Also, the enterprise network 102 may comprises different types of networks compatible with different protocols without departing from the scope of this disclosure.

The assets 106 comprise electronic devices operable to receive and transmit network communication within the enterprise network 102. As used in this disclosure, communication assets 106 are intended to encompass cellular phones, data phones, pagers, portable and stationary computers, smart phones, personal data assistants (PDAs), one or more processors within these or other devices, or any other suitable electronic or processing devices capable of communicating information over a wireless or wired link to the enterprise network 102. Generally, the assets 106 may transmit voice, video, multimedia, text, web content or any other user/client-specific content. In short, asset 106 generates requests, responses or otherwise communicates with other assets 106 and/or PSTN 104 through the enterprise network 102. For purposes of example, the assets 106 may include: a computer device, SIP telephone device, plain old telephone device, a digital phone, a softphone, and/or other suitable telecommunication devices.

The clients 108a-b are any devices (e.g., computing devices) operable to connect or communicate with at least the evaluation system 116. Typically, a client 108 includes, executes, or otherwise presents a Graphical User Interface (GUI) 118 and comprises an electronic device operable to receive, transmit, process and store any appropriate data associated with the system 100. While the illustrated implementation includes the clients 108a-b, the enterprise network 102 may include any number of clients 108 communicably coupled to the evaluation system 116. The client 108 is intended to encompass a personal computer, touch screen terminal, workstation, network computer, kiosk, wireless data port, smart phone, personal data assistant (PDA), cellular phone, one or more processors within these or other devices, or any other suitable processing or electronic device used by a user viewing content from the evaluation system 116, such as reports of usage of telecommunication services. For example, client 108 may be a PDA operable to wirelessly connect with an external or unsecured network. In another example, the client 108 may comprise a laptop that includes an input device, such as a keypad, touch screen, mouse, or other device that can accept information, and an output device that conveys information associated with telecommunication services used by the enterprise network 102. Both the input device and output device may include fixed or removable storage media such as a magnetic computer disk, CD-ROM, or other suitable media to both receive input from and provide output to users of clients 108 through the display, namely the client portion of GUI 118.

GUI 118 comprises a graphical user interface operable to allow the user of client 108 to interface with at least a portion of system 100 for any suitable purpose, such as viewing advertisements. Generally, GUI 118 provides the particular user with an efficient and user-friendly presentation of data provided by or communicated within system 100. GUI 118 may comprise a plurality of customizable frames or views having interactive fields, pull-down lists, and buttons operated by the user. For example, GUI 118 is operable to display certain reports in a user-friendly form based on, for example, department and/or individual use of telecommunications services. As previously mentioned, the system 100 may collect call accounting records generated by PBXs 110a-c and transmit them to the evaluation system 116, which can, in some implementations, allocate the records and calculate costs in accordance with contracts signed between the enterprise and carriers. The GUI 118 may present such reports in one or more formats to enable, for example, employees to control their use of telecommunication services. In some implementations, managers can see his/her own reports and a departmental report, with all employees belonging to his/her cost center. In the case of violations, the GUI may present alarms or other notifications to indicate deviations from enterprise policies. GUI 118 can be configurable, supporting a combination of tables and graphs (bar, line, pie, status dials, etc.). The term graphical user interface may be used in the singular or in the plural to describe one or more graphical user interfaces and each of the displays of a particular graphical user interface. GUI 118 can be any graphical user interface, such as a generic web browser or touch screen, that processes information in system 100 and efficiently presents the results to the user. The evaluation engine 116 can accept data from the client 108 via a the web browser (e.g., Microsoft Internet Explorer or Netscape Navigator) and return the appropriate HTML or XML responses to the browser using the enterprise network 102.

The PBXs 110a-c can include any software, hardware, and/or firmware configured to switch communication sessions between telecommunication assets 106 and/or PSTN 104. For example, the PBX 110 may represent a plurality of assets 106 to PSTN 104, which may reduce the number of trunks 120 to the PSTN 104. In addition to routing calls outside the enterprise, the PBX 110 can, in some implementations, switch call sessions between assets 106 in the enterprise network 102 independent of the PSTN 104. In some implementations, the PBX 110 transmits, to the management system 112, information identifying or otherwise associated with telecommunication services used by the assets 106. For example, the PBX 110 may transmit, to the management system 112, one or more of the following: destination number, carrier, call duration, service type, date, time, origination extension, trunk used.

The management system 112 can include any software, hardware, and/or firmware configured to track information associated with telecommunication services used in the enterprise network 102. For example, the management system 112 may receive information associated with used services and transmit such information to the evaluation system 116 for evaluating. In some implementations, the management system 112 may execute one or more of the following methods: receive information associated with telecommunication services (e.g., call detail records) routed through PBX 110, translate received information to one or more different protocols compatible with the evaluation system 116, receive information associated with employees from the human-resource database 114, transmit the employee's information to the evaluation system 116, and transmit commands to PBXs 110a-c in accordance with information received from the evaluation system 116. For example, the management system 112 may retrieve or otherwise receive information that identifies an individual, title, department, as well as other information stored in the human-resource database 114. While the enterprise network 102 illustrates a single HR database 114, the enterprise network 102 may include a plurality of databases 114 that transmit employees information to the management system 112. In some implementations, the management system 112 may access such databases 114 and/or PBXs 110 using different interfaces such as, for example, serial, TCP/IP socket, file transfer, and others. In some implementations, the management system 112 periodically transmits information to the evaluation system 116. For example, the management system 112 may store records in local files and transmit the records once a day. In some implementations, the management system 112 may transmit information to the evaluation system 116 in response to an event such as, for example, a request from a user. The management system 112 can, in some implementations, compress (e.g., zip) accumulated records in one or more compressed files (e.g., zip files) and encrypt the compressed files prior to transmitting the information. In regards to commands, the management system 112 can, in some implementations, transmit a command to the PBXs 110a-c preventing access to one or more telecommunication services in response to at least information received from the evaluation system 116. For example, the management system 112 may prevent call sessions associated with a PIN and/or extension. In some implementations, the features and functions executed by the management system 112 may be executed by different devices without departing from the scope of this disclosure. For example, data collection from the PBXs 110a-c and/or the HR database 114 may be executed by one device while the management processes, i.e., transmitting commands to PBXs 110a-c, may be performed by a different device.

The human-resources (HR) database 114 can include any software, hardware, and/or firmware configured to store information associated with employees or agents of the enterprise. For example, the HR database 114 may identify or store one or more of the following: individual's name, title, department, cost center, supervisor, person in charge of the cost center. In some implementations, the HR database 114 may transmit information to the management system 112 in response to an event. Such events may include a request, an update to stored information, expiration of a period of time, and/or other event. For example, the HR database 114 may receive information indicating that individual has switched departments and, in response to this update, transmit the updated information to the management system 112. In some implementations, the HR database directly transmits employees information to the evaluation system 116. For example, the HR database 114 may receive information indicating a new employees was hired and, in response to at least the update, transmit the information directly to the evaluation system 116. In addition, the HR database 114 may automatically provide hierarchical information of the enterprise to the management system 112 and/or the evaluation system 116 in response, for example, to an update in the hierarchy of the enterprise. In some implementations, each move, add or change in the payroll of the enterprise can be reflected in the system 100 including hierarchical relationships (e.g., approvers).

The evaluation system 116 can include any software, hardware, and/or firmware configured to evaluate service information in accordance with enterprise policies. For example, the evaluation system 116 may determine costs associated with individuals and/or departments and whether the determined cost violate enterprise policies. In some implementations, the evaluation system 116 may execute one or more of the following methods: receive information identifying telecommunication services used in the enterprise network 102, receive information identifying at least employees information associated with the used telecommunication services, identify pricing policies for using services provided through the PBXs 110a-c, determine cost associated with the used services in accordance with the pricing policies, identify enterprise policies associated with the used telecommunication services, determine whether the enterprise policies are violated based, at least in part, on the determined costs, transmit commands to the PBXs 110a-c in response to at least one or more violations to, for example, prevent access to one or more telecommunication services, and/or transmit requests to employees for information associated with used telecommunication services. In regards to the received information, the evaluation system 116 can, in some implementations, generate or update files associated with the received information. For example, the evaluation system 116 may receive information associated with a PIN and update a file associated with the PIN using the received information. As for employee's information, the evaluation system 116 may generate or update files associated with, for example, an employee, department, title, and/or other aspect of the enterprise. In some implementations, the evaluation system 116 includes enterprise policies for defining usage of telecommunication services. In this case, the evaluation system 116 may transmit the guidelines to employees in response to an event such as a change in position, a new hire, a change in hierarchal structure, or other events. In some implementations, the evaluation system 116 may transmit requests to employees for information associated with used services. For example, the evaluation system 116 may transmit a request to identify certain usage as a personal or labor call. In some implementations, the evaluation system 116 may provide access to audio files to enable to the user to verify designations of used services. In this case, the evaluation system 112 make a visual auditory of the 100% of the declarations (to avoid garbling text) and a phone auditory of the 3% of the declarations, assuring the destination of the calls is which was declared by the user. In some implementations, the evaluation system 114 can notified the result of the phone auditory.

In regards to evaluating information associated with service usage, the evaluation system 112 can, in some implementations, determine costs associated with the usage based, at least in part, on carrier agreements, duration, time, and/or other parameters. In addition, the evaluation system 116 may determine costs in accordance with different aspects of the enterprise such as, for example, individual, title, service type, department, and/or other aspects. Based at least on the determined costs and/or employees information, the evaluation system 112 may generate reports associated with service usage. As mentioned earlier, the reports may be generated in accordance with a time period (e.g., a month), a department, individual, supervised employees, and/or other aspects.

In managing telecommunication costs, the evaluation system 116 can, in some implementations, determine violations of enterprise policies. For example, the evaluation system 116 may identify logical and/or mathematical expressions for comparing determined costs and enterprise policies. In response to at least a violation of the policies, the evaluation system 116 may transmit a notification to the individual, the department, supervisor, and/or others. In addition or alternatively, the evaluation system 116 may transmit a command, to the PBX 110 through the management system 112, terminating access to one or more telecommunication services in response to at least the determined violations. For example, the evaluation system 116 may transmit a command blocking a PIN and/or extension associated with an individual. In some implementations, the evaluation system 116 can, prior to determining a violation, transmit a request to the individual for information associated with usage (e.g., one or more reported calls). For example, the evaluation system 116 may request a name of the person or company called and the nature of the relationship (e.g., personal, vendor, customer, branch). In some implementations, the evaluation system 116 may not report information associated with personal calls in the departmental reports to substantially preserve an employee's privacy. The evaluation system 116 may store a number declared such that additional requests associated with the number are not transmitted to employees. In some implementations, the evaluation system 116 may automatically block PINs and/or extensions associated with individuals that fail to respond to request for information associated with called numbers. Other remedial measures are possible. In this implementation, the evaluation system 116 may automatically transmit a command removing the block in response to at least the employees providing the requested information.

In some implementations, the evaluation system 116 automatically manages PINs and/or extensions assigned or otherwise associated with individuals in or associated with the enterprise. For example, the evaluation system 116 may automatically manage the creation, modification and/or deletion of PINs and/or telephone extensions. For example, the evaluation system 116 may include drivers for different PBX vendors and models. In some implementations, the evaluation system 116 transmits a command to reset all PINs and generate new ones. For example, the evaluation system 116 may generate one pin code per employee and assign restrictions to services in accordance with enterprise policy (e.g., default local calls for everyone, dialing restrictions according to job position). In connection with generating new PINs, the evaluation system 116 can, in some implementations, automatically transmit the new PINs to associated employees. In regard to extensions, the evaluation system 116 can, in some implementations, transmit a notification of extensions assigned to an employee. In some implementations, the evaluation system 116 may assign an extension to a department or delete unassigned extensions.

The PSTN network 104 is used for communicating, for example, via telephone land lines. In one implementation, the PSTN network 104 is of the form of a circuit-switched telephone network which may be used for land line voice calls, digital subscriber line (DSL) internet access, and/or dial-up modem internet access. A set of access tandem and end office switches segment the network into sections which are considered to be within a local calling distance. For example, communications relayed through the PSTN network 104 can be sent from a local user via an end office switch, through a series of access tandem switches, and through the remote end office switch to a remote user. In transmitting signals, PSTN 104 may use one or more of the following: telephones, key telephone systems, private branch exchange trunks 120, and certain data arrangements. Since PSTN 104 may be a collection of different telephone networks, portions of PSTN 104 may use different transmission media and/or compression techniques. Completion of a circuit in PSTN 104 between a call originator and a call receiver may require network signaling in the form of either dial pulses or multi-frequency tones.

Figure 2:
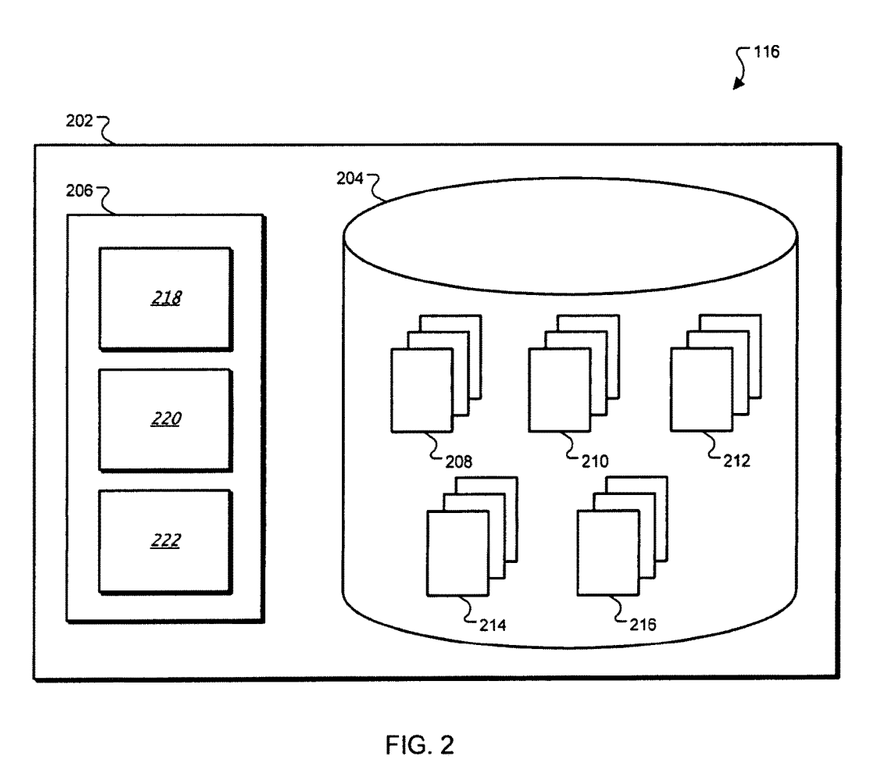
FIG. 2 is an example evaluation system of FIG. 1.

FIG. 2 is an example evaluation system 116 for evaluating telecommunication services used in the enterprise network 102 of FIG. 1. In the example shown, evaluation system 116 comprises a single evaluation server 202 in the enterprise network 102, though other configurations are possible. In the illustrated implementation, the evaluation server 116 comprises an electronic computing device operable to receive, transmit, process and store data associated with the system 100. The system 100 can be implemented using computers other than servers, as well as a server pool. Indeed, the evaluation server 202 may be any computer, electronic or processing device such as, for example, a blade server, general-purpose personal computer (PC), Macintosh, workstation, Unix-based computer, or any other suitable device. In other words, the system 100 may include computers other than general purpose computers as well as computers without conventional operating systems. The evaluation server 202 may be adapted to execute any operating system including Linux, UNIX, Windows Server, or any other suitable operating system.

In the illustrated implementation, the evaluation server 202 includes memory 204 and a processor 206. The memory 204 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, the memory 204 includes employee profiles 208, tracking files 210, evaluation criteria 212, reports 214, and enterprise policies 216. Though, the memory 204 can, in some implementations, include other data without departing from the scope of this disclosure. The employee profiles 208 include one or more data structures or entries for including or otherwise identifying information associated with employees of the enterprise. For example, the employee profiles 208 may include or at least be based on information received from the human resource database 114. In this example, the employee profiles 208 may identify an individual's name, title, department, extension, PIN, services available for the employee, cost center, person in charge of the cost center, extensions, password, password category and/or others. In addition or alternatively, the employee profiles 208 may include hierarchal information associated with the enterprise such as, for example, corporate structure. For example, the employee profile 208 may identify supervisors of an employee and/or individuals supervised by the employee. In some implementations, the employee profile 208 may be associated with a single employee or multiple employees or multiple profiles 208 may be associated with a single employee. In some implementations, the employee profile 208 maybe associated with a department, a job type, a title, and/or other aspects of the enterprise.

Tracking files 210 can include one or more entries or data structures that identify telecommunication services used, available, and/or otherwise associated with the enterprise network 102. For example, the tracking files 210 may include or otherwise identify telecommunication services used (e.g., type) and associated PINs and/or extensions. In some implementations, the tracking files 210 may include one or more of the following: service type, amount consumed (e.g., time, data amount), destination, carrier, date, time, originating PIN, originating extension, PBX 110, destination, call type (e.g., personal, work related), trunk used, and/or others. For example, the tracking file 210 may include or at least be based on information received from the PBX 110 through the management system 112. In some implementations, the tracking files 210 include aggregated data associated with one or more parameters. For example, the tracking files 210 may include aggregated data associated with a PIN and/or extension and a service type. Alone or in combination, the tracking files 210 may include aggregated data for business departments (e.g., research and development, human resources, sales).

Evaluation criteria 212 include any parameters, variables, algorithms, instructions, rules, objects and/or other directives for determining usage of telecommunication services in the enterprise network 102. For example, the evaluation criteria 212 may include or otherwise identify directives for determining costs associated with service usage. In some implementations, the evaluation criteria 212 identify one or more expressions (e.g., mathematical, logical) for determining costs for services provided by one or more PBXs 110. Such expressions may be based on one or more parameters such as PBX type, time, associated service provider, duration, data amount, associated service contract, number dialed, and/or others. In some implementations, the evaluation criteria 212 may be associated with a service provider, a service agreement, a PBX 110, an employee, a position, a department, and/or other aspects associated with the enterprise.

Based, at least in part on tracking files 210 and/or the evaluation criteria 212, the reports 214 include one or more entries or data structures that identify information associated with a tracked entity such as an individual, a department, cost of used services, service usage, and/or others. For example, the report 214 may identify an individual and service usage based on service type and costs associated with the individual. The report 214 may be based or otherwise associated with one or more criteria. For example, the report 214 may be associated with one or more of the following criteria: enterprise policies, PBX, carrier, service type, cost, PIN, extension, amount, date, individual, title, violations, or other suitable aspects associated with an individual and/or enterprise. In some implementations, the report 214 includes aggregated costs associated with each service type. In addition, the report 214 may include information identifying actions that a user of the client 108 may perform in response to the displayed information. For example, the report 214 may enable the system or an administrator to block one or more telecommunication services available to the PIN and/or extension. In some implementations, the reports 214 may include audio files to enable to the user to verify designations of used services. In this case, the reports 214 make a visual auditory of the 100% of the declarations (to avoid garbling text) and a phone auditory of the 3% of the declarations, assuring the destination of the calls is which was declared by the user. In some implementations, the report 214 may include a selection enabling the user to notified the result of the phone auditory.

For example, the enterprise policies 216 may be used to identify service usage that violates one or more enterprise policies. For example, the enterprise policies 216 may include expressions to determine violations by an employee for exceeding thresholds for service usage. In some implementations, the enterprise policy 216 may be associated with an employee, title, department, and/or other aspect of an enterprise. In the case that the enterprise policies 216 include expressions, the enterprise policy 216 may identify thresholds for comparing with aggregate cost, cost of a single use, aggregate time, time of a single use, and/or any other aspect of using telecommunication services. In addition, the enterprise policies 216 may identify instructions for notifying employees in response to a violation. For example, the enterprise policy 216 may include instructions for updating associated reports 214, transmitting an email, and/or other notifications. Alternatively or in combination, the enterprise policies 216 may include instructions for transmitting commands to block or otherwise prevent access to one or more services in response to a violation. For example, the enterprise policies 216 may include instructions for transmitting commands to the PBXs 110 to block services associated with a PIN and/or extension of an employee, cost limits and time limits, and/or others.

Processor 206 executes instructions and manipulates data to perform operations of the evaluation server 202. Although FIG. 1 illustrates a single processor 206 in server 202, multiple processors 206 may be used according to particular needs, and reference to processor 206 is meant to include multiple processors 206 where applicable. In the illustrated implementation, processor 206 executes a tracking engine 218, an evaluation engine 220, and a filtering engine 222 at any appropriate time such as, for example, in response to a request or input from a user of the server 202 or any appropriate system coupled with the network 102. The tracking engine 218 includes any software, hardware, and/or firmware, or combination thereof, operable to track service information and/or personnel information associated with the enterprise. For example, the tracking engine 218 may periodically or in response to another event transmit requests to the management system 112 for information associated with services used. Similarly, the tracking engine 218 may, in some implementations, periodically or in response to another event transmit requests to the HR database for information associated with personnel. In response to at least receiving information, the tracking engine 218 can, in some implementations, generate or update tracking files 208 and/or employee profiles with the received information.

The evaluation engine 220 includes any software, hardware, and/or firmware, or combination thereof, operable to evaluate services used by employees in and/or associated with the enterprise network 102. In evaluating services usage, the evaluation engine 220 may map or otherwise associate uses identified by the tracking files 210 with an aspect of an enterprise identified in the employee profiles 208. For example, such aspects may include one or more of the following: an individual, title, supervised employees, department, and/or other aspects. In some implementations, the evaluation engine maps the employee information and the service information based, at least in part, on PINs and/or extensions. For example, an employee profile 208 may identify one or more PINs and/or extensions associated with an employee, and a tracking file 210 may include service usage associated with the one or more PINs and/or extensions. In addition, the evaluation engine 220 can, in some implementations, evaluate the service usage based, at least in part, on the evaluation criteria 212. For example, the evaluation criteria 212 may identify mathematical expressions for aggregating data, determining costs. In some implementations, the evaluation engine 220 determines costs in accordance with a request from the client 108. For example, the evaluation engine 220 may receive a request for total costs of service usage associated with a department. In connection with evaluating the service usage, the evaluation engine 220 can, in some implementations, generate one or more reports 214 based, at least in part, on the evaluation.

The filtering engine 222 includes any software, hardware, and/or firmware, or combination thereof, operable to determine violations of enterprise policies based, at least in part, on evaluations of service usage. For example, the filtering engine 222 may identify criteria for evaluating service costs using evaluation criteria 216. The criteria may include a number, a range, a threshold, and/or any other suitable criteria for evaluating service usage. Evaluating service costs may include solely evaluating the amount used, evaluating results based on used amounts, a combination of the foregoing, and/or any other suitable evaluation. In some implementations, the evaluation engine 222 may compare the service usage and the criteria using any suitable mathematical and/or logical expression. For example, the evaluation engine 222 may determine or otherwise identify ranges associated with a service type for a given individual using the evaluation criteria 216. In response to violating the ranges, the evaluation engine 222 may determine the employee violated enterprise policies.

Figure 3:
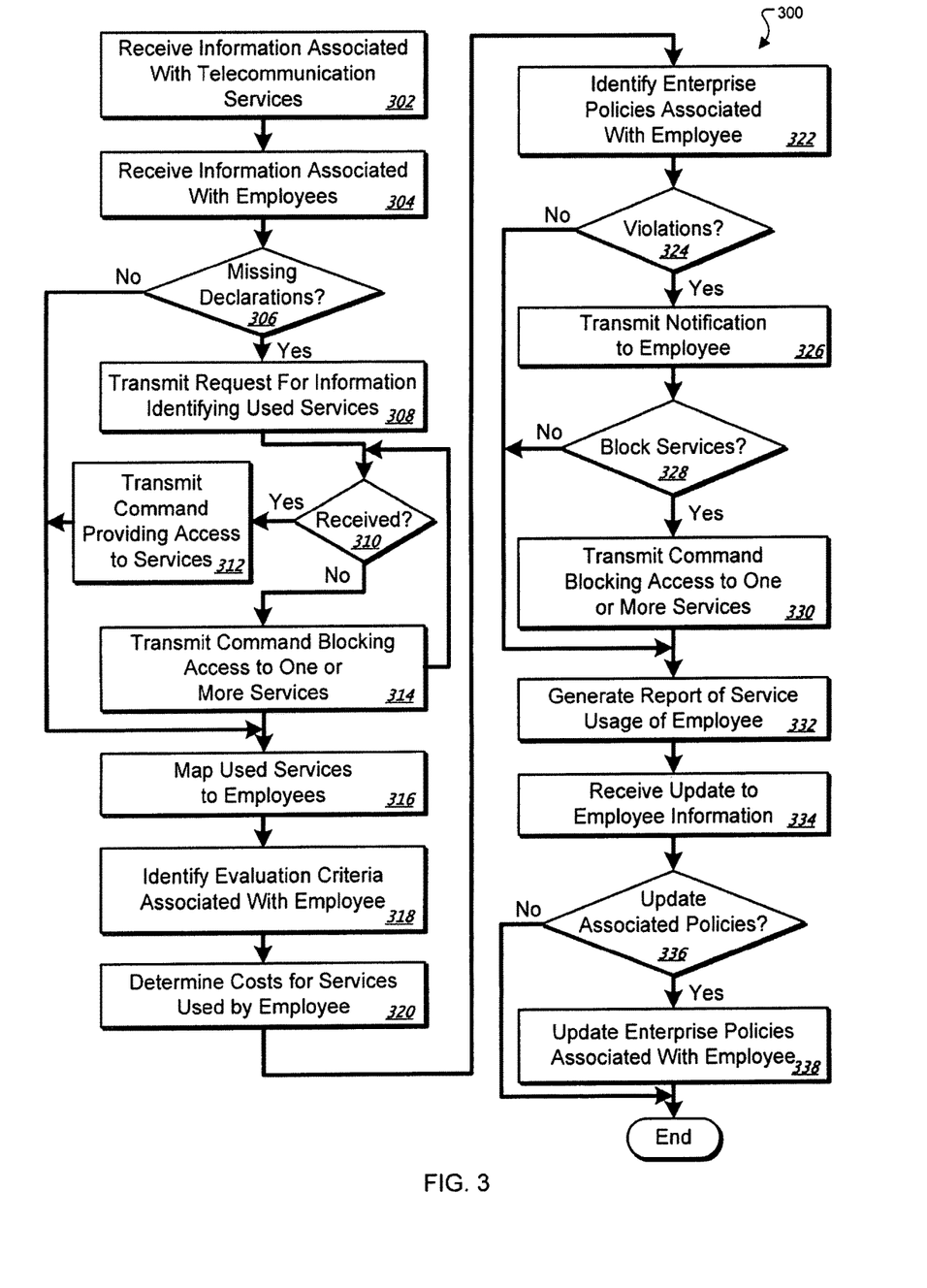
FIG. 3 is a flow chart illustrating an example method for enforcing enterprise policies in the communication system of FIG. 1.

FIG. 3 is a flowchart illustrating an example method 300 for managing telecommunication expenses in accordance with some implementations of the present disclosure. Generally, the method 300 describes receiving information associated with used telecommunication services and determining whether the usage violates one or more enterprise policies. The method 300 contemplates using any appropriate combination and arrangement of logical elements implementing some or all of the described functionality.

The method 300 includes the following two high level processes: (1) aggregating data associated with the use of telecommunication services at steps 302 to 320; and (2) determining whether the aggregated data indicates a violation of enterprise policies at steps 322 to 338. Method 300 begins at step 302 where information associated with telecommunication services is received/identified. For example, the tracking engine 218 may receive information originating from the PBXs 110 indicating service usage and generate or update one or more tracking files 210. At step 304, information associated with employees is received/identified. In the example, the tracking engine 218 may receive information associated with employees and generate or update one or more employee profiles 208. If declarations from employees that are associated with service usage are missing at decisional step 306, then, at step 308, information requests are generated (e.g., a request is transmitted for information associated with used services). Returning to the example, the tracking engine 218 may determine that information indicating the call type and entity called is missing from one or more of the entries in the tracking files 210 and transmit a request to the client 108 for additional information. If the additional information is received/available at decisional step 310, then, at step 312, access is enabled (e.g., a command to provide access to any potentially blocked services is transmitted). If the additional information is not received at decisional step 310, then, at step 314, access to service is denied (e.g., a command to block access to one or more services is transmitted). As for the example, the tracking engine 218, in response to not receiving requested information, may transmit a command to the PBXs 110 through the management system 112 to block access to one or more telecommunication services associated with a PIN and/or extension. Returning to decisional step 306, if no declarations are missing, then execution proceeds to step 316. The used services are mapped to one or more employees at step 316. In the example, the tracking engine 218 may map services identified in the tracking files 210 to employees identified in the employee profiles 208 using, for example, a PIN and/or extension. Evaluation criteria associated with one or more employees is identified at step 318. Again returning to the example, the evaluation engine 220 may identify evaluation criteria 212 associated with an aspect of an enterprise such as an employee, department, and/or others. At step 320, the costs for services used by employee is determined using the evaluation criteria. In the example, the evaluation engine 220 determines the cost of the employee used services based, at least in part, on associated tracking files 210 and evaluation criteria 212.

Turning to the determining violations process, enterprise policies associated with the employee/identity are identified at step 322. In the example, the filtering engine 222 identifies enterprise policies 216 associated with the employee. If one or more violations are determined at decisional step 324, then, at step 326, a notification of the violation is transmitted to, for example, the employee. If the violated policies indicate that services are to be blocked at decisional step 328, then, at step 330, services are blocked (e.g., a command is transmitted to block one or more services). As for the example, the filtering engine 222 may transmit a notification to the client 108 of the violation and transmit a command to the PBXs 110 through the management system 112 to block services associated with a PIN and/or extension assigned to the employee. Returning to the decisional step 324, if no violations are determined, then execution proceeds to step 332. A report of the service usage is generated at step 332. In the example, the evaluation engine 220 and/or the filtering engine 222 may generate and/or update one or more reports 214 detailing usage. At step 334, an update to employee information is received. Returning to the example, the tracking engine 218 may receive an indication from the HR database 114 that an employee has changed job title. If the policies need to be updated at decisional step 336, then, at step 338, enterprise policies associated with the employee in accordance with the updated employee information.

A number of implementations of the invention have been described. Nevertheless, it will be understood that various modifications may be made without departing from the spirit and scope of the invention.

What is claimed is:
1. A method for tracking enterprise expenses, comprising:
receiving, from one or more Private Branch eXchanges (PBXs) in an enterprise network and connected to a public switched telephone network (PSTN), information identifying a plurality of different telecommunication services consumed by an employee in the PSTN, wherein one or more computing devices in the enterprise network receives the information directly from the PBXs;
determining pricing policies for each of the plurality of different telecommunication services;

determining, by the one or more computing devices in the enterprise network, costs associated with each of a plurality of different telecommunication services consumed by the employee based on the information directly received from the PBXs;

aggregating, by the one or more computing devices in the enterprise network, the costs associated with the plurality of different telecommunication services accessed in an enterprise network;

automatically determining one or more policies of an enterprise for evaluating the plurality of different telecommunication services accessed in the enterprise network, the enterprise policies associated with the employee and defining at least one of a logical expression or a mathematical expression;

determining, by the one or more computing devices in the enterprise network, a violation of one or more enterprise policies based, at least in part, on the at least one of a logical expression or a mathematical expression and the aggregated costs; and in response to at least the violation, automatically updating settings in the one or more of the PBXs to prevent access by the employee to at least one of the plurality of different telecommunication services.

2. The method of claim 1, further comprising:
determining one or more declarations of at least a portion of the aggregated data are absent, wherein the declarations identify information associated with a destination of a call; and
transmitting a request to the employee for the one or more declarations that are absent.

3. The method of claim 2, further comprising transmitting, to a Private Branch eXchange (PBX) from the enterprise network, a command to block one or more telecommunication services in response to not receiving the requested one or more declarations within a period of time.

4. The method of claim 1, further comprising transmitting a notification of the violation of one or more policies to the employee.

5. The method of claim 1, wherein modifying access comprises blocking access to one or more telecommunication services in response to at least the violation of the one or more policies.

6. The method of claim 1, further comprising:
receiving a request for a report on telecommunication services associated with an aspect of the enterprise; and
automatically generating the report including information identifying employees.

7. The method of claim 1, wherein the enterprise policies comprise initial enterprise policies, the method further comprising:
receiving information indicating an update to information associated with an employee; and
associating at least some enterprise policies different from the initial enterprise policies based, at least in part, on the updated employee information.

8. A system for tracking enterprise expenses, comprising:
memory configured to store one or more policies of an enterprise; and
one or more processors configured to:
receive, from one or more Private Branch eXchanges (PBXs) in an enterprise network and connected to a public switched telephone network (PSTN), information identifying a plurality of different telecommunication services consumed by an employee in the PSTN, wherein the system in the enterprise network receives the information directly from the PBXs;

determine pricing policies for each of the plurality of different telecommunication services;

determine, by the system in the enterprise network, costs associated with each of a plurality of different telecommunication services consumed by the employee based on the information directly received from the PBXs;

aggregate, by the system in the enterprise network, the costs associated with the plurality of different telecommunication services accessed in an enterprise network;

automatically determine one or more policies of an enterprise for evaluating the plurality of different telecommunication services accessed in the enterprise network, the enterprise policies associated with the employee and defining at least one of a logical expression or a mathematical expression;

determine, by the system in the enterprise network, a violation of one or more enterprise policies based, at least in part, on the at least one of a logical expression or a mathematical expression and the aggregated costs; and in response to at least the violation, automatically update settings in the one or more of the PBXs to prevent access by the employee to at least one of the plurality of different telecommunication services.

9. The system of claim 8, the processors further configured to:
determine one or more declarations of at least a portion of the aggregated data are absent, wherein the declarations identify information associated with a destination of a call; and
transmit a request to the employee for the one or more declarations that are absent.

10. The system of claim 9, the processors further configured to transmit, to a PBX from the enterprise network, a command to block one or more telecommunication services in response to not receiving the requested one or more declarations within a period of time.

11. The system of claim 8, the processors further configured to transmit a notification of the violation of one or more policies to the employee.

12. The system of claim 8, the processors configured to modify access comprises the processors configured to block access to one or more telecommunication services in response to at least the violation of the one or more policies.

13. The system of claim 8, the processors further configured to:
receive a request for a report on telecommunication services associated with an aspect of the enterprise; and
automatically generate the report including information identifying employees.

14. The system of claim 8, wherein the enterprise policies comprise initial enterprise policies, the processors further configured to:
receive information indicating an update to information associated with an employee; and
associate at least some enterprise policies different from the initial enterprise policies based, at least in part, on the updated employee information.

15. Apparatus for tracking enterprise expenses comprising computer-readable instructions embodied on non-transitory media and operable to:
receive, from one or more Private Branch eXchanges (PBXs) in an enterprise network and connected to a public switched telephone network (PSTN), information identifying a plurality of different telecommunication services consumed by an employee in the PSTN, wherein the apparatus in the enterprise network receives the information directly from the PBXs;

determine pricing policies for each of the plurality of different telecommunication services;

determine, by the apparatus in the enterprise network, costs associated with each of a plurality of different telecommunication services consumed by the employee based on the information directly received from the PBXs;

aggregate, by the apparatus in the enterprise network, the costs associated with the plurality of different telecommunication services accessed in an enterprise network;

automatically determine one or more policies of an enterprise for evaluating the plurality of different telecommunication services accessed in the enterprise network, the enterprise policies associated with the employee and defining at least one of a logical expression or a mathematical expression;

determine, by the apparatus in the enterprise network, a violation of one or more enterprise policies based, at least in part, on the at least one of a logical expression or a mathematical expression and the aggregated costs; and in response to at least the violation of the one or more enterprise policies, automatically update settings in the one or more of the PBXs to prevent access by the employee to at least one of the plurality of different telecommunication services.

16. The apparatus of claim 15, the computer-readable instructions further operable to:

determine one or more declarations of at least a portion of the aggregated data are absent, wherein the declarations identify information associated with a destination of a call; and transmit a request to the employee for the one or more declarations that are absent.

17. The apparatus of claim 16, the computer-readable instructions further operable to transmit, to a PBX from the enterprise network, a command to block one or more telecommunication services in response to not receiving the requested one or more declarations within a period of time.

18. The apparatus of claim 15, the computer-readable instructions further operable to transmit a notification of the violation of one or more policies to the employee.

19. The apparatus of claim 15, the computer-readable instructions further operable to block access to one or more telecommunication services in response to at least the violation of the one or more policies.

20. The apparatus of claim 15, the computer-readable instructions further operable to:

receive a request for a report on telecommunication services associated with an aspect of the enterprise; and automatically generate the report including information identifying employees.

21. The apparatus of claim 15, wherein the enterprise policies comprise initial enterprise policies, the computer-readable instructions further operable to:

receive information indicating an update to information associated with an employee; and associate at least some enterprise policies different from the initial enterprise policies based, at least in part, on the updated employee information.

* * * * *